United States Patent
Tani et al.

(10) Patent No.: US 10,249,306 B2
(45) Date of Patent: Apr. 2, 2019

(54) SPEAKER IDENTIFICATION DEVICE, SPEAKER IDENTIFICATION METHOD, AND RECORDING MEDIUM

(71) Applicant: NEC Corporation, Minato-ku, Tokyo (JP)

(72) Inventors: Masahiro Tani, Tokyo (JP); Takafumi Koshinaka, Tokyo (JP); Yoshifumi Onishi, Tokyo (JP); Shigeru Sawada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/760,617

(22) PCT Filed: Jan. 16, 2014

(86) PCT No.: PCT/JP2014/000183
§ 371 (c)(1),
(2) Date: Jul. 13, 2015

(87) PCT Pub. No.: WO2014/112375
PCT Pub. Date: Jul. 24, 2014

(65) Prior Publication Data
US 2015/0356974 A1   Dec. 10, 2015

(30) Foreign Application Priority Data
Jan. 17, 2013   (JP) .................... 2013-006350

(51) Int. Cl.
*G10L 15/00* (2013.01)
*G10L 17/12* (2013.01)
(Continued)

(52) U.S. Cl.
CPC .............. *G10L 17/12* (2013.01); *G10L 17/04* (2013.01); *G10L 17/06* (2013.01)

(58) Field of Classification Search
CPC .......... G10L 17/12; G10L 17/06; G10L 17/04
See application file for complete search history.

(56) References Cited

U.S. PATENT DOCUMENTS

| 2010/0114572 A1* | 5/2010 | Tani ................. G10L 17/08 704/247 |
| 2012/0101822 A1* | 4/2012 | Dinerstein ............ G10L 17/04 704/246 |
| 2018/0158463 A1* | 6/2018 | Ge ....................... G10L 17/04 |

FOREIGN PATENT DOCUMENTS

JP     H11352984 A     12/1999

OTHER PUBLICATIONS

International Search Report of PCT Application No. PCT/JP2014/000183 dated Apr. 22, 2014.
(Continued)

*Primary Examiner* — Satwant K Singh (57) ABSTRACT

A speaker identification device includes: a primary speaker identification unit that computes, for each pre-stored registered speaker, a score that indicates the similarity between input speech and speech of the registered speakers; a similar speaker selection unit that selects a plurality of the registered speakers as similar speakers according to the height of the scores thereof; a learning unit that creates a classifier for each similar speaker by sorting the speech of a certain similar speaker among the similar speakers as a positive instance and the speech of the other similar speakers as negative instances; and a secondary speaker identification unit that computes, for each classifier, a score of the classifier with respect to the input speech, and outputs an identification result.

7 Claims, 9 Drawing Sheets

(51) Int. Cl.
   *G10L 17/04* (2013.01)
   *G10L 17/06* (2013.01)

(56) References Cited

OTHER PUBLICATIONS

English Translation of written opinion for PCT Application No. PCT/JP2014/000183.
D. A. Reynolds and R. C. Rose, "Robust Text-Independent Speaker Identification Using Gaussian Mixture Speaker Models," IEEE Trans. Speech Audio Processing, 1995, vol. 3, No. 1, pp. 72-83 Cited in the Specification.
K. Shikano, K. Itou, T. Kawahara, K. Takeda and M. Yamamoto, "Speech Recognition System" Ohmsha, Ltd. 2001, pp. 13-15 Cited in the Specification.
W. M. Campbell, D. E. Sturim and D. A. Reynolds, "Support Vector Machines Using GMM Supervectors for Speaker Verification," IEEE Signal Processing Letters, 2006, vol. 13, No. 5, pp. 308-311 Cited in the Specification.
Nello Cristianini, John Shawe-Taylor, "An Introduction to Support Vector Machines and Other Kernel-based Learning Methods," Kyoritsu Shuppan Co., Ltd. 2005, pp. 130-149 Cited in the Specification.
Shan Fine, et al., A Hybrid GMM/SVM Approach to Speaker Identification, Proc. ICASSP'01, May 7, 2001, vol. I, pp. 417-420 Cited in ISR.
Michael Schmidt, et al., Speaker Identification via Support Vector Classifiers, Proc. ICASSP-96, May 7, 1996, pp. 105-108 Cited in ISR.

\* cited by examiner

SPEAKER IDENTIFICATION DEVICE, SPEAKER IDENTIFICATION METHOD, AND RECORDING MEDIUM

This application is a National Stage Entry of PCT/JP2014/000183 filed on Jan. 16, 2014, which claims priority from Japanese Patent Application 2013-006350 filed on Jan. 17, 2013, the contents of all of which are incorporated herein by reference, in their entirety.

TECHNICAL FIELD

The present invention relates to a speaker identification device, a speaker identification method, and a speaker identification program, and particularly to a speaker identification device, a speaker identification method, and a speaker identification program, which recognize one among preregistered speakers who has made input speech.

BACKGROUND ART

Figure 6:
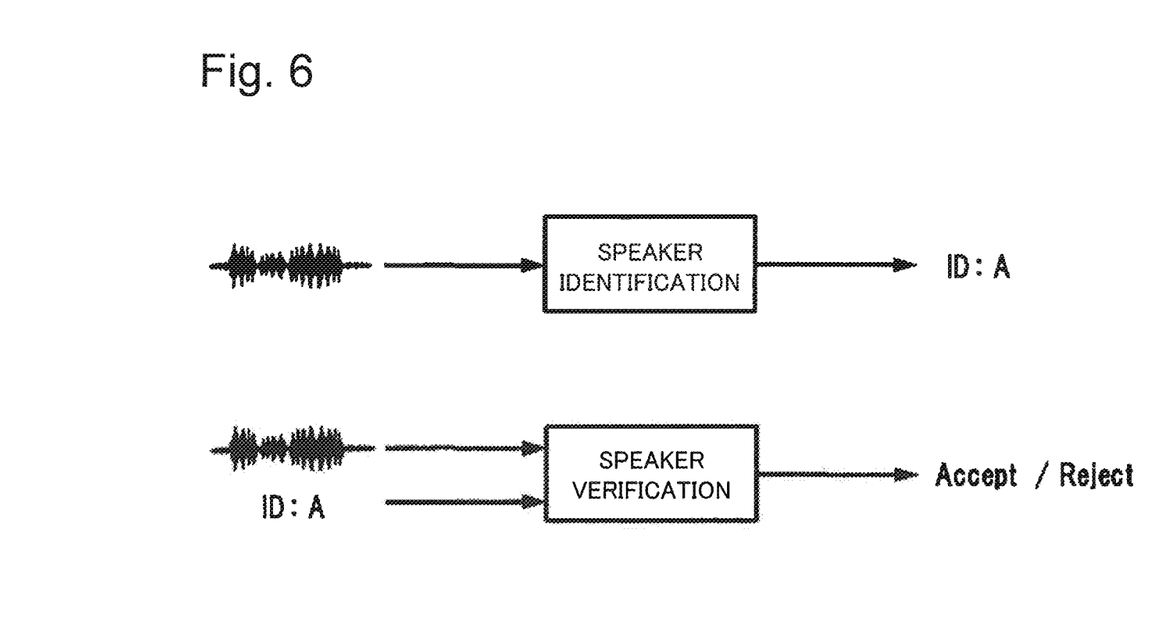
FIG. 6 is a schematic view illustrating an overview of a general speaker recognition technique.

FIG. 6 is a schematic view illustrating an overview of a general speaker recognition technique. In general, as illustrated in FIG. 6, speaker recognition can be roughly divided into speaker identification and speaker verification. In the speaker identification, speech is input (received), one among preregistered speakers who has made the input speech is recognized, and an ID (Identification) of the speaker is outputted. The ID is an identifier that uniquely specifies the speaker and is assigned to the speaker upon registration. Whereas, in the speaker verification, speech and an ID are input, whether the input speech is made by a speaker of the input ID, in other words, the authentication of the speaker is determined, and either Accept or Reject is outputted.

Figure 7:
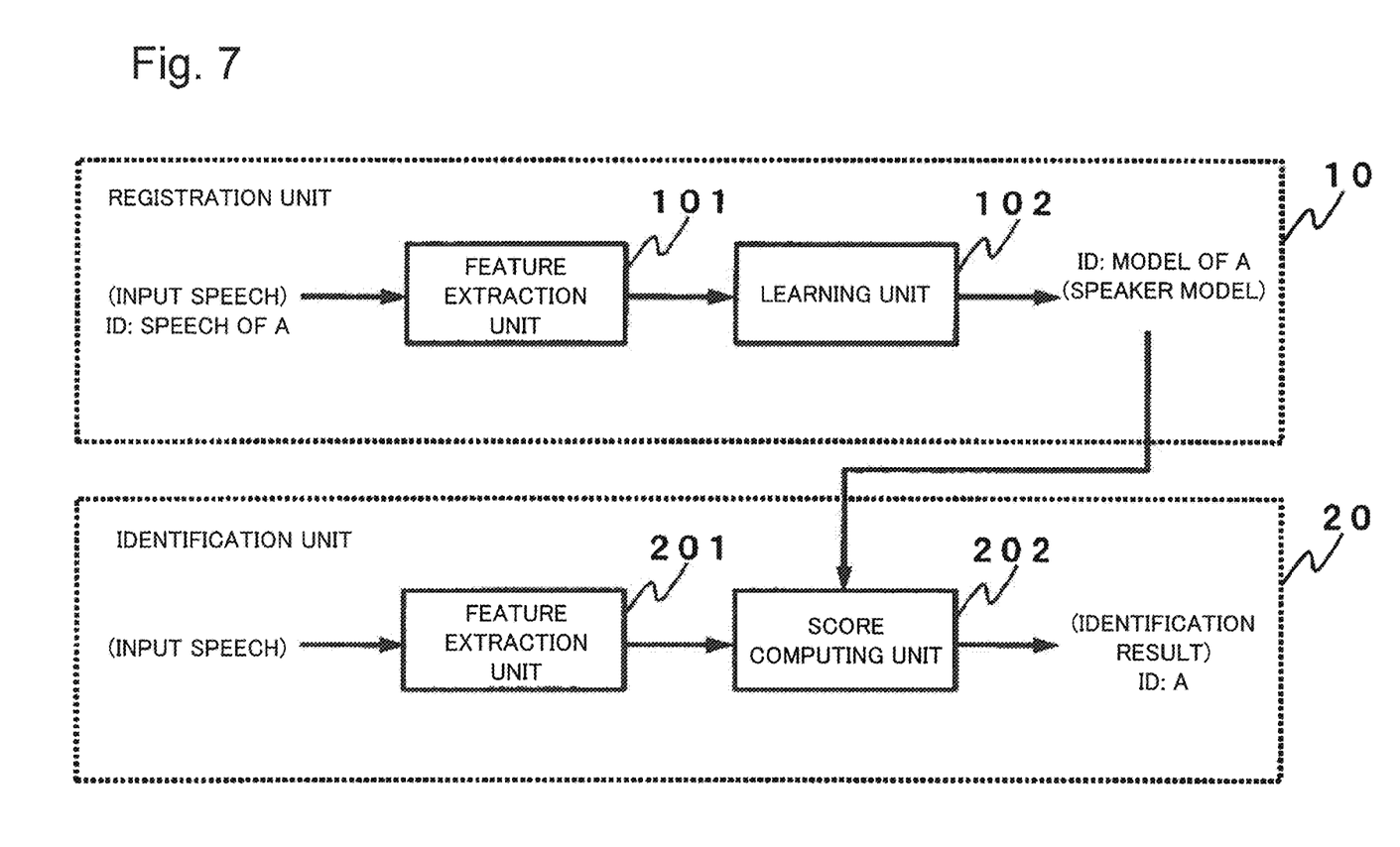
FIG. 7 is a block diagram illustrating a schematic configuration of a general speaker identification device.

NPTL 1 describes an example of a general speaker identification device. FIG. 7 is a block diagram illustrating a schematic structure of a general speaker identification device. As illustrated in FIG. 7, a general speaker identification device includes a registration unit 10 and an identification unit 20. The registration unit 10 includes a feature extraction unit 101 and a learning unit 102.

The feature extraction unit 101 computes feature amounts that are necessary for speaker identification of an input speech. Mel-Frequency Cepstrum Coefficients (MFCC) described in NPTL 2 are used for the feature amounts.

The learning unit 102 creates speaker models from the computed feature amounts. The speaker model is a probability model that expresses the features of speech of a speaker. A known Gaussian Mixture Model (GMM) is used for the speaker model. The speaker model is stored in association with an ID of a registered speaker.

The identification unit 20 includes a feature extraction unit 201 and a score computing unit 202. The function of the feature extraction unit 201, which is the same function as the feature extraction unit 101 of the registration unit 10, computes feature amounts necessary for speaker identification from the input speech. The score computing unit 202 compares the computed feature amounts and the speaker models of preregistered speakers, and outputs a speaker ID relating to the speaker model with the highest score as the identification result. The score is a likelihood of a model in relation to a feature amount, where the higher the likelihood is, the more similar the input speech and the speech of the registered speaker are.

Figure 8:
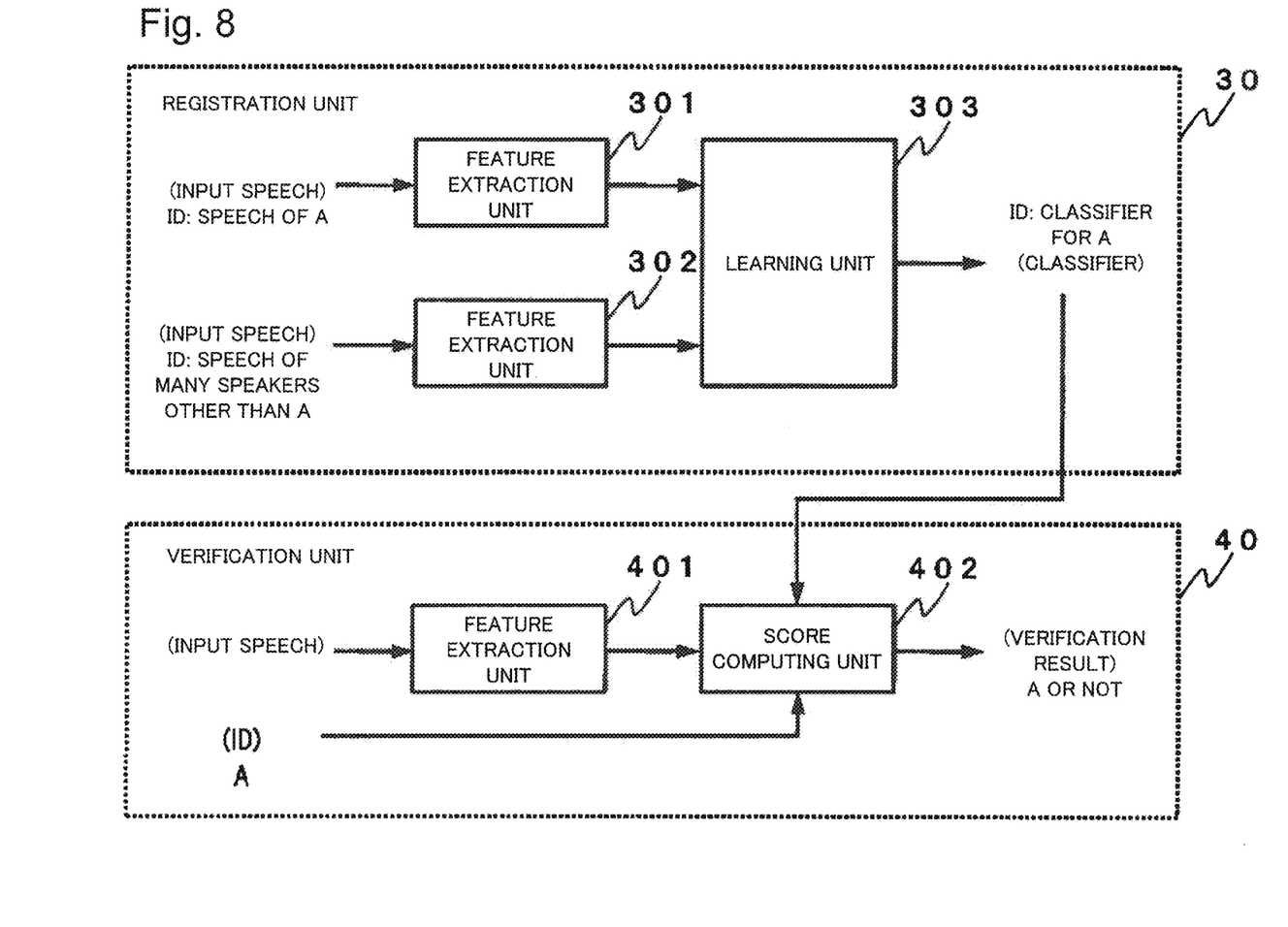
FIG. 8 is a block diagram illustrating a schematic configuration of a general speaker verification device.

NPTL 3 describes an example of a general speaker verification device. FIG. 8 is a block diagram illustrating a schematic structure of a general speaker verification device.

As illustrated in FIG. 8, a general speaker verification device includes a registration unit 30 and a verification unit 40.

The registration unit 30 includes a feature extraction unit 301, a feature extraction unit 302, and a learning unit 303. The feature extraction unit 301 and the feature extraction unit 302 have the same function, and compute feature amounts necessary for speaker verification from the input speech. The feature extraction unit 301 inputs speech of a speaker to be registered and outputs a speech feature amount of the speaker to be registered. Whereas, the feature extraction unit 302 inputs speech of a plurality of speakers other than the speaker to be registered and outputs speech feature amounts of the plurality of speakers other than the speaker to be registered. For the feature amounts, GMM Supervectors (GSV) are used. As described in NPTL 3, the GSV is a supervector that is obtained by extracting only average vectors of the speaker models that are expressed as GMMs and concatenating the average vectors. In other words, first of all, it is necessary to create speaker models from speech in order to calculate a GSV.

The learning unit 303 learns classifiers by sorting the feature amount of a speaker to be registered as a positive instance and the feature amounts of a plurality of speakers as negative instances. Known Support Vector Machines (SVM) are used for learning of the classifiers. The SVM is a method of acquiring a plane (a classification plane) that separates the feature points of positive instances and the feature points of negative instances. The shortest distance between the classification plane and the feature points is referred to as a margin, and the parameters of the classification plane are learned so as to maximize this margin. NPTL 4 describes a margin maximization criterion of an SVM.

The verification unit 40 includes a feature extraction unit 401 and a score computing unit 402. The function of the feature extraction unit 401, which is the same function as the feature extraction unit 301 and the feature extraction unit 302 of the registration unit 30, computes a GSV as a feature amount from the input speech. The score computing unit 402 outputs a score of two values (1 or −1) as the verification result, using the computed feature amounts and the classifiers relating to the input ID. In this case, score 1 means that the input speech and the input ID are of the same speaker's (principal), while score −1 means that the input speech and the input ID are of different speakers' (impostor).

The method of modelling speech of a speaker using the GMM described in NPTL 1, can be used not only for speaker identification but also for speaker verification. NPTL 3 compares the verification precision of a method based on the GMM and a method based on the above-described SVM, where the latter shows higher precision. However, as there is no effective method of using the SVM for speaker identification, methods based on the GMM are mainly used.

CITATION LIST

Non Patent Literature

[NPTL 1] D. A. Reynolds and R. C. Rose, "Robust Text-Independent Speaker Identification Using Gaussian Mixture Speaker Models," IEEE Trans. Speech Audio Processing, 1995, Vol. 3, No. 1, pp. 72-83

[NPTL 2] K. Shikano, K. Itou, T. Kawahara, K. Takeda and M. Yamamoto, "Speech Recognition System" Ohmsha, Ltd. 2001, pp. 13-15

[NPTL 3] W. M. Campbell, D. E. Sturim and D. A. Reynolds, "Support Vector Machines Using GMM Supervectors for Speaker Verification," IEEE Signal Processing Letters, 2006, Vol. 13, No. 5, pp. 308-311

[NPTL 4] Nello Cristianini, John Shawe-Taylor, "An Introduction to Support Vector Machines and Other Kernel-based Learning Methods," KYORITSU SHUPPAN CO., LTD. 2005, pp. 130-149

SUMMARY OF INVENTION

Technical Problem

A problem of a general speaker identification device as described above is that, if a plurality of speakers whose features of speech are similar to one another are registered, the identification precision of the similar speakers thereof is low. This is because speaker identification is performed only on the basis of features of the speech of speakers to be registered.

The objective of the present invention is to provide a speaker identification device, a speaker identification method, and a speaker identification program, which can realize highly precise speaker identification even if a plurality of speakers whose speech features are similar to one another are registered.

Solution to Problem

The speaker identification device of the present invention includes: a primary speaker identification unit that computes, for each of registered speakers stored in advance, a score that indicates the similarity between input speech and speech of the registered speakers; a similar speaker selection unit that selects a plurality of the registered speakers as similar speakers according to the height of the scores; a learning unit that creates a classifier for each of the similar speakers by sorting the speech of a certain similar speaker among the similar speakers as a positive instance and the speech of the other similar speakers as negative instances; and a secondary speaker identification unit that computes, for each classifier, a score of the classifier with respect to the input speech and outputs an identification result.

The speaker identification method of the present invention includes: computing, for each of registered speakers stored in advance, a score that indicates the similarity between input speech and speech of the registered speakers; selecting a plurality of the registered speakers as similar speakers according to the height of the scores; creating a classifier for each of the similar speakers by sorting the speech of a certain similar speaker among the similar speakers as a positive instance and the speech of the other similar speakers as negative instances; and computing, for each of the classifiers, a score of the classifier with respect to the input speech and outputs an identification result.

The speaker identification program according to the present invention includes: primary speaker identification processing of computing, for each of registered speakers stored in advance, a score that indicates the similarity between input speech and speech of the registered speakers; similar speaker selection processing of selecting a plurality of the registered speakers as similar speakers according to the height of the scores; learning processing of creating a classifier for each of the similar speakers by sorting the speech of a certain similar speaker among the similar speakers as a positive instance and the speech of the other similar speakers as negative instances; and secondary speaker identification processing of computing, for each of the classifiers, a score of the classifier with respect to the input speech and outputs an identification result.

Advantageous Effects of Invention

According to the present invention, highly precise speaker identification can be realized, even if a plurality of speakers whose speech features are similar to one another are registered.

DESCRIPTION OF EMBODIMENTS

Exemplary Embodiment 1

Figure 1:
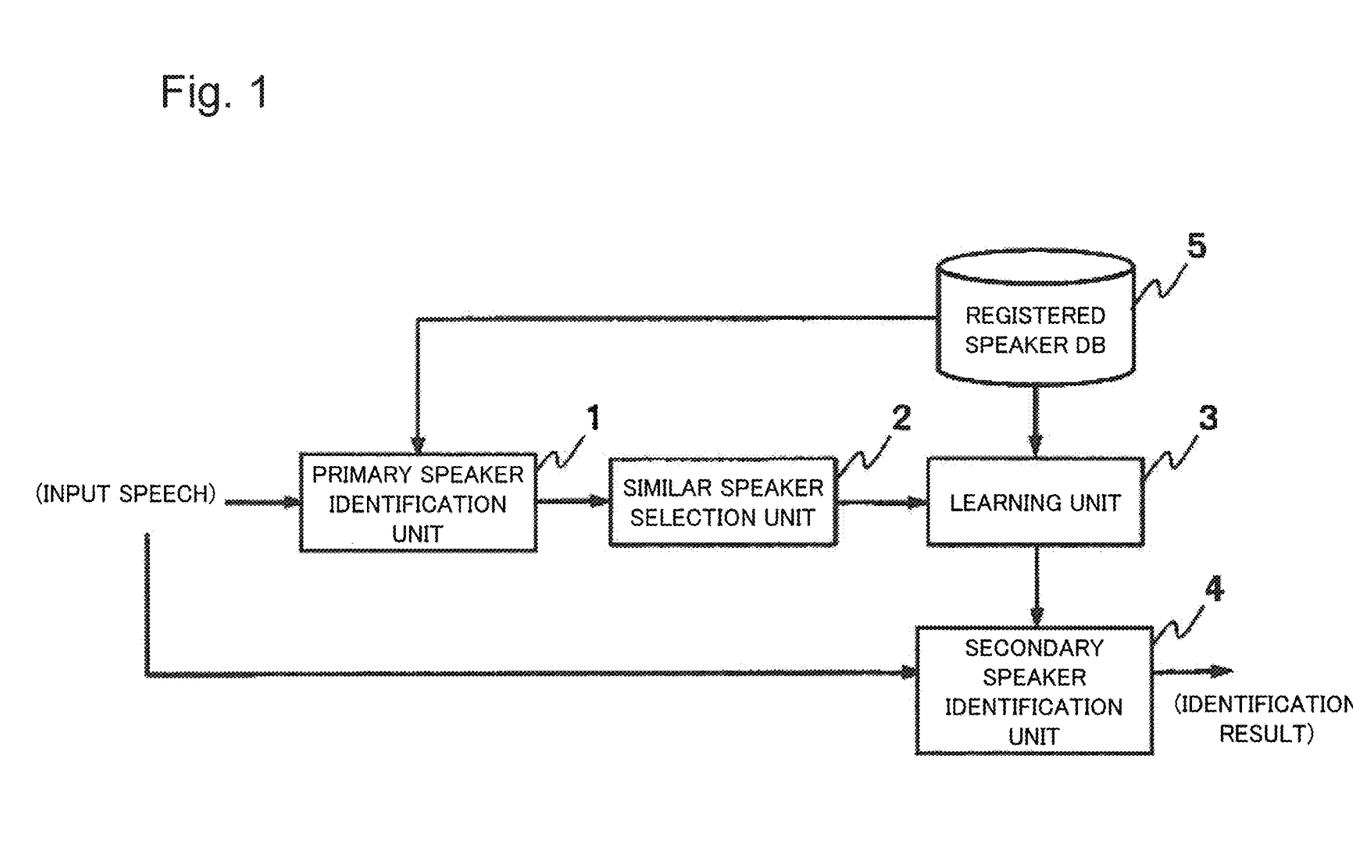
FIG. 1 is a block diagram illustrating a configuration of a first exemplary embodiment and a second exemplary embodiment of a speaker identification device according to the present invention.
Figure 2:
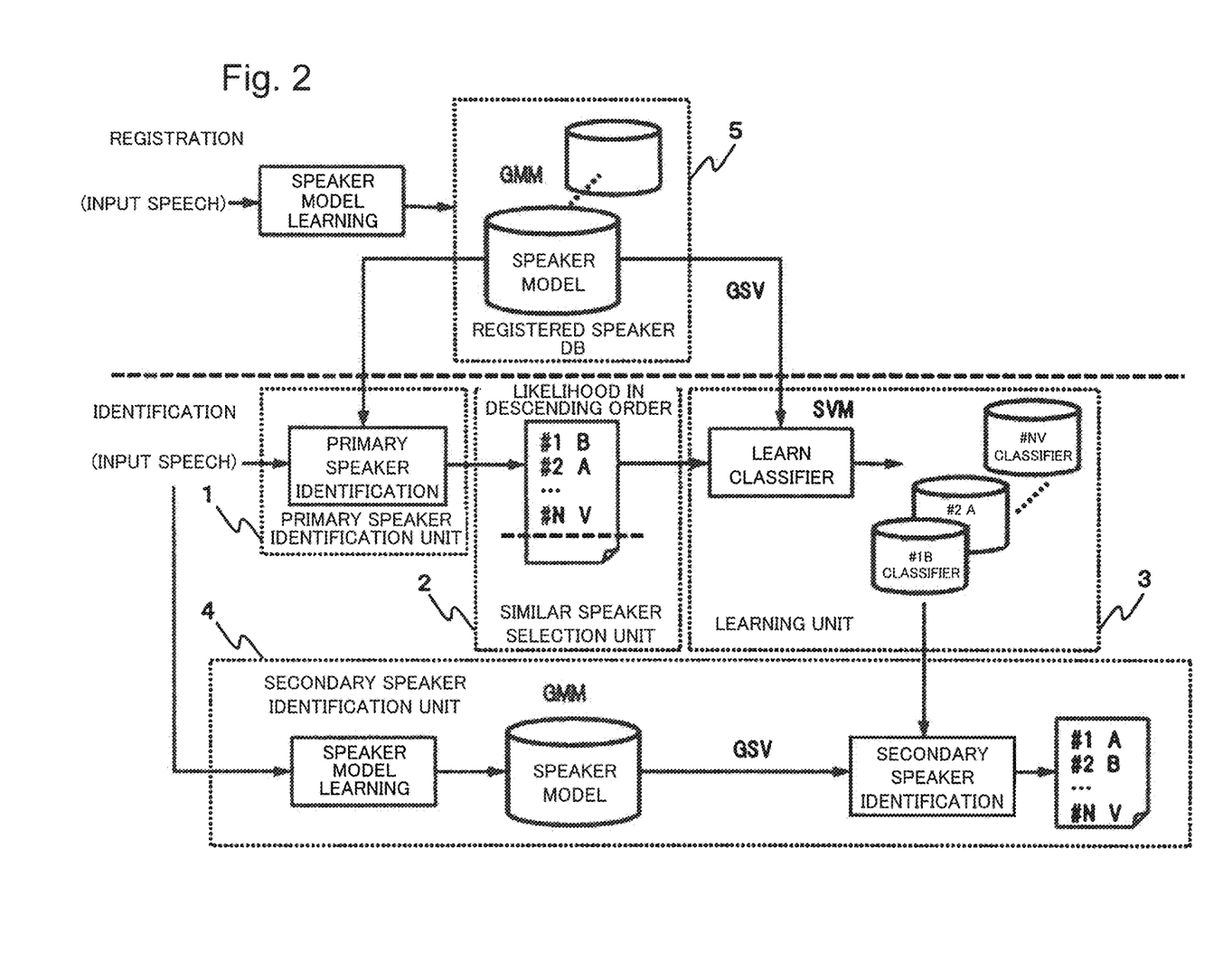
FIG. 2 is an explanatory diagram illustrating a specific example of an operation of the first exemplary embodiment of the speaker identification device according to the present invention.

The following will describe the first exemplary embodiment (Exemplary Embodiment 1) of the present invention with reference to the drawings. FIG. 1 is a block diagram illustrating a configuration of a speaker identification device of the first exemplary embodiment. FIG. 2 is an explanatory diagram illustrating a specific example of an operation of the speaker identification device of the present exemplary embodiment.

As illustrated in FIG. 1, the speaker identification device of the present exemplary embodiment includes a primary speaker identification unit 1, a similar speaker selection unit 2, a learning unit 3, a secondary speaker identification unit 4 and a registered speaker DB (DatabBase) 5. The primary speaker identification unit 1, the similar speaker selection unit 2, the learning unit 3, and the secondary speaker identification unit 4 are implemented, for example, by hardware that is designed to perform specific arithmetic processing and the like or an information processing device, such as a CPU (Central Processing Unit), that operates according to a program. In the specific example of the operation illustrated in FIG. 2, a method based on the GMM is used for primary speaker identification, and a method based on the SVM is used for secondary speaker identification.

The primary speaker identification unit 1 compares input speech with speech of pre-stored registered speakers in the registered speaker DB 5 and computes a score that represents the similarity to the input speech for each of the registered speakers. The score is specifically a likelihood of a speaker model with respect to the input speech (feature amount).

The registered speaker DB 5 stores speaker models that model the features of speech of registered speakers for the number of the registered speakers. The example illustrated in FIG. 2 is a method described in NPLT 1, where the features of the speech of registered speakers are modeled as GMMs. However, the speaker models may not be GMMs. As long as the features of the speech of speakers can be expressed, for example, the speaker models may be known Hidden Markov Models (HMM).

The primary speaker identification unit 1 may be configured to perform identification processing in multiple stages. For example, in the case of two-stage processing, the registered speaker DB 5 stores light version and standard version speaker models. In such a case, the primary speaker identification unit 1 first compares the input speech with the light version speaker models and computes a score for each registered speaker. Then, the primary speaker identification unit 1 narrows down to speakers with high scores, compares the input speech with the standard version speaker models relating to the narrowed-down speakers, and computes scores. The difference between a light version and a standard version is, for example, a difference in the number of the mixtures in GMMs if the speaker models are GMMs. After performing speaker identification using GMMs with a relatively small number of mixtures as a light version (for example, the number of mixtures is eight), the primary speaker identification unit 1 identifies the speakers, which are narrowed down in the light version, using GMMs with a relatively large number of mixtures as a standard version (for example, the number of mixtures is 512). In this way, identification processing in two stages (the same applies to multiple stages of more than three stages) makes it possible to accelerate the processing of the primary speaker identification unit 1.

The similar speaker selection unit 2 selects top-N people with high scores as similar speakers from the pairs of the registered speakers and the scores, which are outputted from the primary speaker identification unit 1. In the example illustrated in FIG. 2, the similar speaker selection unit 2 selects a speaker B with the first likelihood (#1) to a speaker V with the Nth likelihood (#N) as similar speakers. The value of N is set beforehand.

Figure 3:
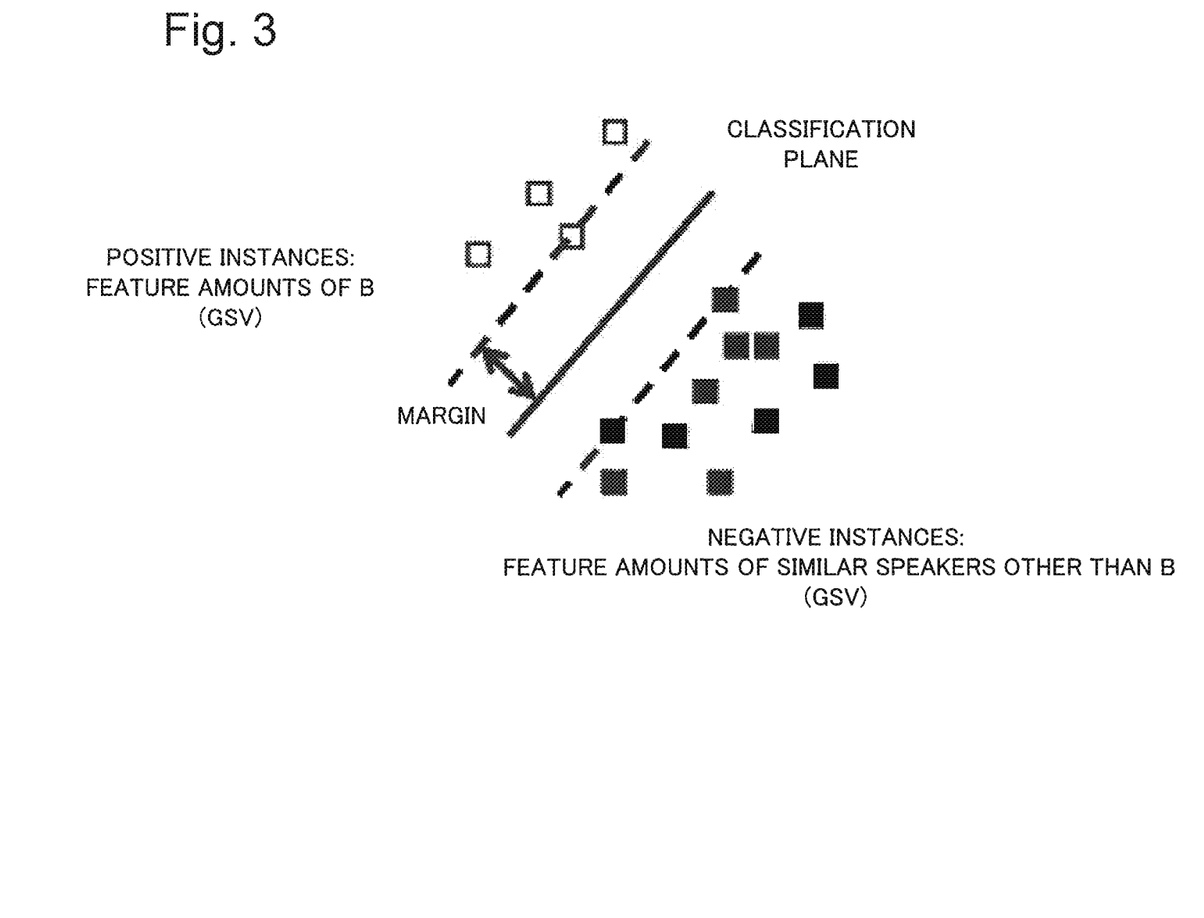
FIG. 3 is an explanatory diagram illustrating a specific example of learning a classifier by the SVM.

The learning unit 3 creates a classifier for each similar speaker by a method using a support vector machine (SVM). Specifically, the learning unit 3 creates N pieces of classifiers for each of the similar speakers, using N pieces of registered speaker data relating to the N similar speakers that are outputted by the similar speaker selection unit 2, by sorting data of a certain speaker among the similar speakers as a positive instance and data of the rest N−1 speakers as negative instances. FIG. 3 is an explanatory diagram illustrating a specific example of learning a classifier by the SVM. As illustrated in FIG. 3, when a classifier is created for a speaker B with the first likelihood (#1), the feature amount (GSV) that can be obtained from a speaker model (GMM) relating to B is sorted as a positive instance, while the feature amounts (GSVs) that can be obtained from speaker models (GMMs) relating to similar speakers other than B (A, . . . , V) as negative instances. Then, the learning unit 3 leans parameters of a classification plane with a maximum margin, based on the margin maximization criterion of the SVM described in NPTL 4. The learning unit 3 creates a classifier for each of the speakers A to V with the second to Nth likelihoods by the same procedure as the above-described speaker B. However, the classifier may not be an SVM; for example, the classifier may use a known neutral network instead.

The learning unit 3 may not use data of N−1 speakers as negative instances, and may use data of top-M speakers with high scores that are outputted from the primary speaker identification unit 1 as negative instances. For example, the learning unit 3 may use data of top-M speakers (M>N−1) as negative instances when N is small, and may use top-M speakers (M<N−1) as negative instances when N is large. The former method suppresses deterioration of identification precision due to lack of learning data in the later stage (the secondary speaker identification unit 4), while the latter method can accelerate the learning processing.

Further, the learning unit 3 may store the pairs of a similar speaker ID list in which similar speaker IDs are listed and classifiers, as use history of the speaker identification device of the first exemplary embodiment in the past. Then, the learning unit 3 may create a classifier only when there is a difference between the similar speaker ID list selected by the similar speaker selection unit 2 and the similar speaker ID list in the history. Then, if there is no difference, the learning unit 3 outputs the classifiers in the history. The learning unit 3 can accelerate (skip) the learning processing by creating a classifier only when there is a difference from the history.

The secondary speaker identification unit 4 computes, for each classifier, a score of the classifier with respect to the input speech and outputs an identification result. The secondary speaker identification unit 4, specifically, inputs the input speech to the N pieces of classifiers outputted by the learning unit 3 and outputs the registered speaker ID relating to the classifier that indicates the highest score as the final identification result. This score is, for example, a distance from the feature point of the input speech to the classification plane. In the example illustrated in FIG. 2, the secondary speaker identification unit 4 creates a speaker model (GMM) using the input speech by the same procedure as the registration, and obtains a feature amount (GSV). Then, the secondary speaker identification unit 4 computes a distance from the feature point (GSV) extracted from the input speech to the classification plane for each classifier and outputs the ID of the registered speaker relating to the feature point with the largest distance as the final identification result. When the feature point is expressed by an equation (1) (R is a set of real numbers, k is the number of dimensions of a feature amount), and the classification plane is expressed by an equation (2) (w is a weight vector, b is a bias), a distance from the feature point to the classification plane can be calculated by an equation (3).

[Math 1]

$$x_0 \in \mathbb{R}^k \qquad (1)$$

[Math 2]

$$wx + b = 0 \qquad (2)$$

[Math 3]

$$\frac{wx_0 + b}{\|w\|} \qquad (3)$$

Figure 4:
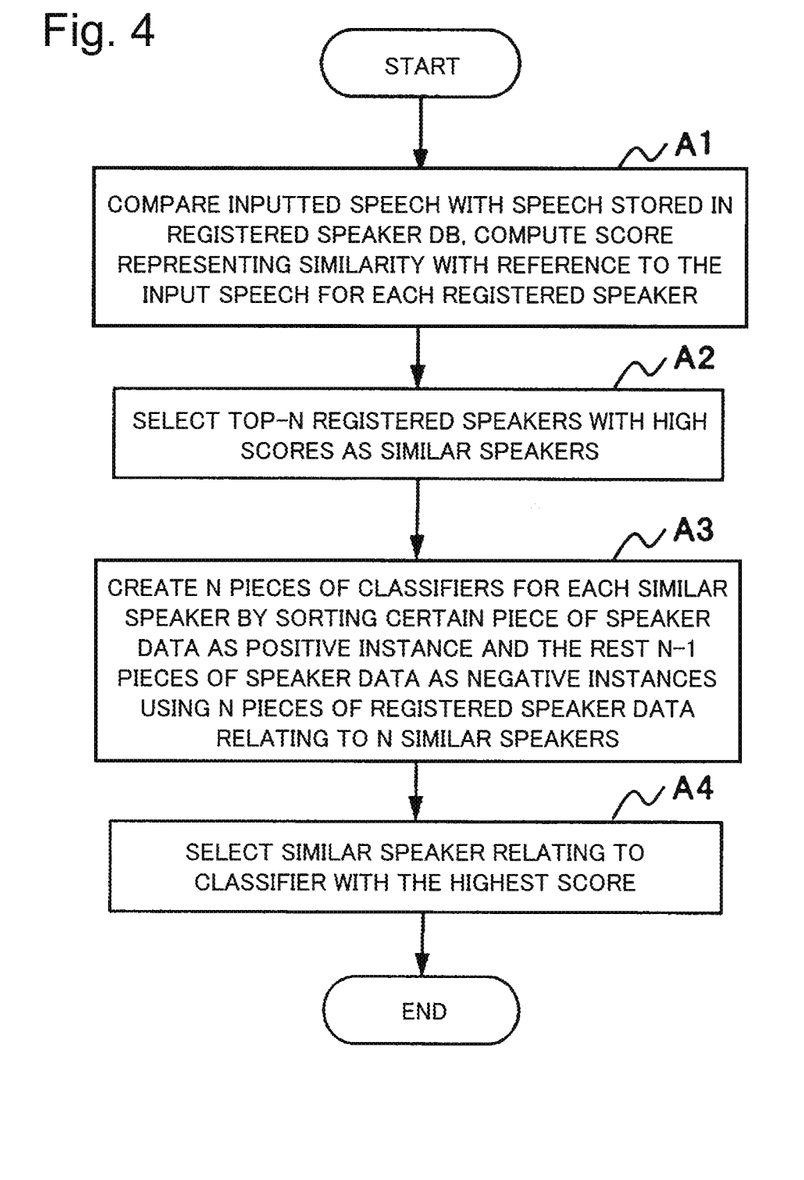
FIG. 4 is a flowchart illustrating an operation of the first exemplary embodiment of the speaker identification device according to the present invention.

Next, the overall operation of the speaker identification device of the present exemplary embodiment will be described. FIG. 4 is a flowchart illustrating an operation of the speaker identification device of the present exemplary embodiment.

First, the primary speaker identification unit 1 compares input speech with speech stored in the registered speaker DB 5 and computes, for each registered speaker, a score that represents the similarity with respect to the input speech (step A1). The registered speaker DB 5 stores speaker models of registered speakers. The score is a likelihood of a speaker model with respect to the input speech.

Next, the similar speaker selection unit 2 selects top-N speakers with high scores as similar speakers from the pairs of the registered speakers and the scores, which are obtained in the processing of step A1 (step A2).

Next, the learning unit 3 creates N pieces of classifiers for each of the similar speakers using N pieces of data of the registered speakers relating to the N similar speakers obtained in the processing of step A2, by sorting data of a certain speaker among the similar speakers as a positive instance and data of the rest N−1 speakers as negative instances (step A3). The registered speaker data is, for example, GMM supervectors (GSVs) extracted from speaker models expressed as GMMs.

Finally, the secondary speaker identification unit 4 inputs the input speech to each of the N pieces of the classifiers obtained at step A3, computes scores, and outputs the registered speaker ID relating to the classifier that indicates the highest score as the final result of speaker identification (step A4). The score is, for example, if the classifier is of an SVM, a distance from the feature point extracted from the input speech to the classification plane.

Next, effects of the present exemplary embodiment will be described. As the speaker identification device of the present exemplary embodiment identifies the input speech using classifiers, the speaker identification device can realize highly precise speaker identification even when a plurality of speakers whose features of speech are similar to one another are registered. Further, the speaker identification device of the present exemplary embodiment creates classifiers only for speech of registered speakers who have predetermined similarities with respect to the input speech, thereby efficiently performing identification processing.

Further, an effect of creating classifiers on the fly as with the speaker identification device of the present exemplary embodiment, instead of creating classifiers in advance, will be described in detail. Creating classifiers on the fly has an effect of using less computing resources when registering new speakers, compared with a case of creating the classifiers in advance. If classifiers are created in advance, for example, when the number of registered speakers is 10,000, 10,000 classifiers that have learned by sorting a certain speaker as a positive instance and the rest 9,999 speakers as negative instances are prepared. Here, when a new speaker (10,001st) is registered, the already created 10,000 classifiers need to be created again from scratch. When the above-described GSVs are used for the feature amounts and the above-described SVMs are used for the classifiers, as GSVs generally have high dimensions (for example, if a speaker model is a GMM with the number of mixtures 512 and the number of dimensions 40, the GSV is 512×40=20480 dimensions), it takes extremely long time to recreate 10,000 classifiers, which is unrealistic. When the classifiers are created on the fly, a large amount of classifiers do not need to be created again from scratch every time a new speaker is registered. As with the speaker identification device of the present exemplary embodiment, the speaker identification device is made feasible only after classifiers are created on the fly only with similar speakers (for example, only 20 similar speakers).

Exemplary Embodiment 2

The following will describe the second exemplary embodiment (Exemplary Embodiment 2) with reference to the drawings. As the configuration of the speaker identification device of the present exemplary embodiment is the same configuration as the speaker identification device of the first exemplary embodiment illustrated in FIG. 1, the second exemplary embodiment will be described using the configuration illustrated in FIG. 1. The speaker identification device of the present exemplary embodiment differs from the speaker identification device of the first exemplary embodiment only in the function of the similar speaker selection unit 2 so that the description about configuration other than the similar speaker selection unit 2 will be omitted.

The similar speaker selection unit 2 inputs the pairs of the registered speakers and the scores that represents similarities of the registered speakers with respect to the input speech, which are outputted by the primary speaker identification unit 1, and compares the scores relating to the registered speakers with a preset threshold of the scores. Then, the similar speaker selection unit 2 selects registered speakers relating to the scores not less than the threshold as similar speakers. In other words, the number of the similar speakers will be dynamically changed in accordance with the input speech.

Figure 5:
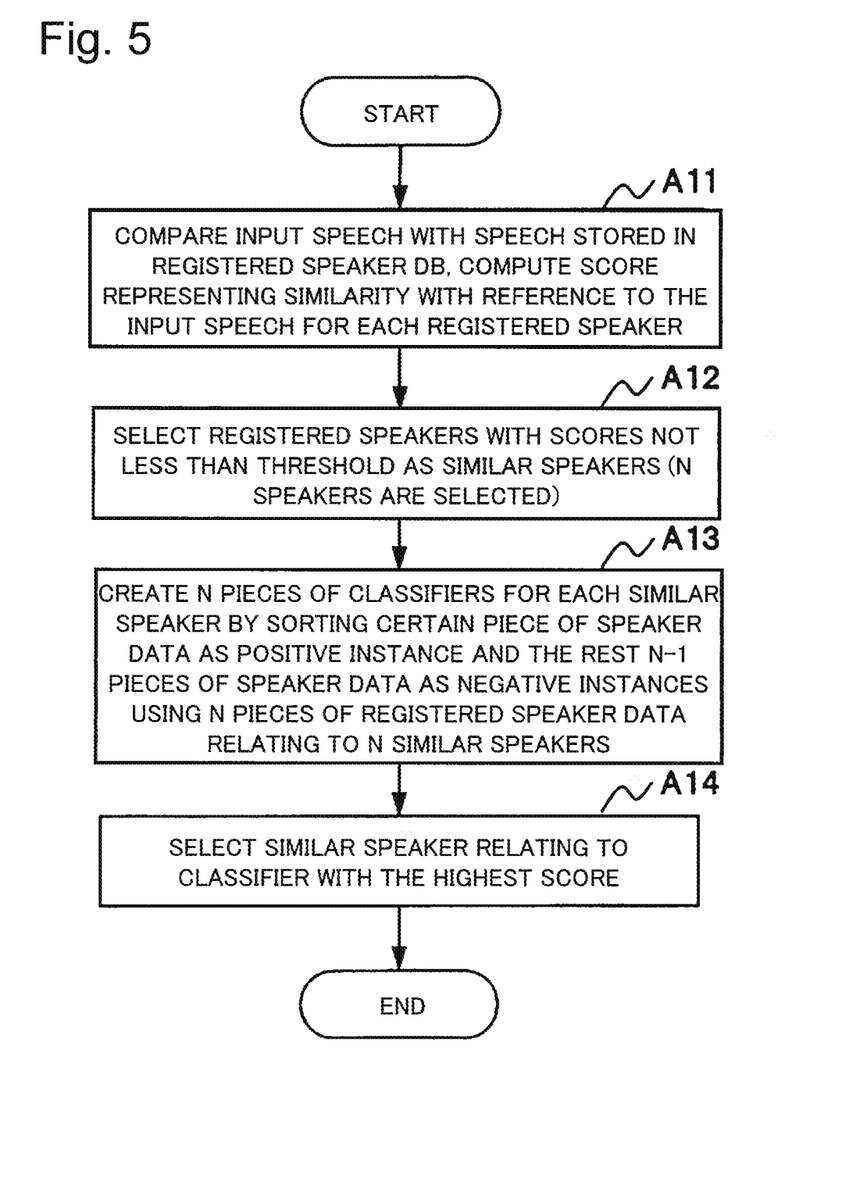
FIG. 5 is a flowchart illustrating an operation of the second exemplary embodiment of the speaker identification device according to the present invention.

Next, the operation of the speaker identification device of the present exemplary embodiment will be described. FIG. 5 is a flowchart illustrating an operation of the speaker identification device of the present exemplary embodiment.

As steps A11, A13, and A14 illustrated in FIG. 5 are the same steps as the steps A1, A3, and A4 in the first exemplary embodiment illustrated in FIG. 4, the description thereof will be omitted.

The similar speaker selection unit 2 compares the scores relating to the registered speakers with a preset threshold of the scores from pairs of the registered speakers and the scores, which are obtained from the processing at step A11, and selects registered speakers relating to the scores not less than the threshold as similar speakers (step A12).

Next, an effect of the speaker identification device of the present exemplary embodiment will be described. In the present exemplary embodiment, the similar speaker selection unit 2 selects registered speakers relating to the scores not less than the preset score threshold as similar speakers. Therefore, compared with a method of fixing the number of similar speakers, the present embodiment can reduce the cases of omission of selecting speakers with high similarities and the cases of selecting speakers with low similarities. Reducing the former can improve identification precision. Reducing the latter can improve identification speed.

Figure 9:
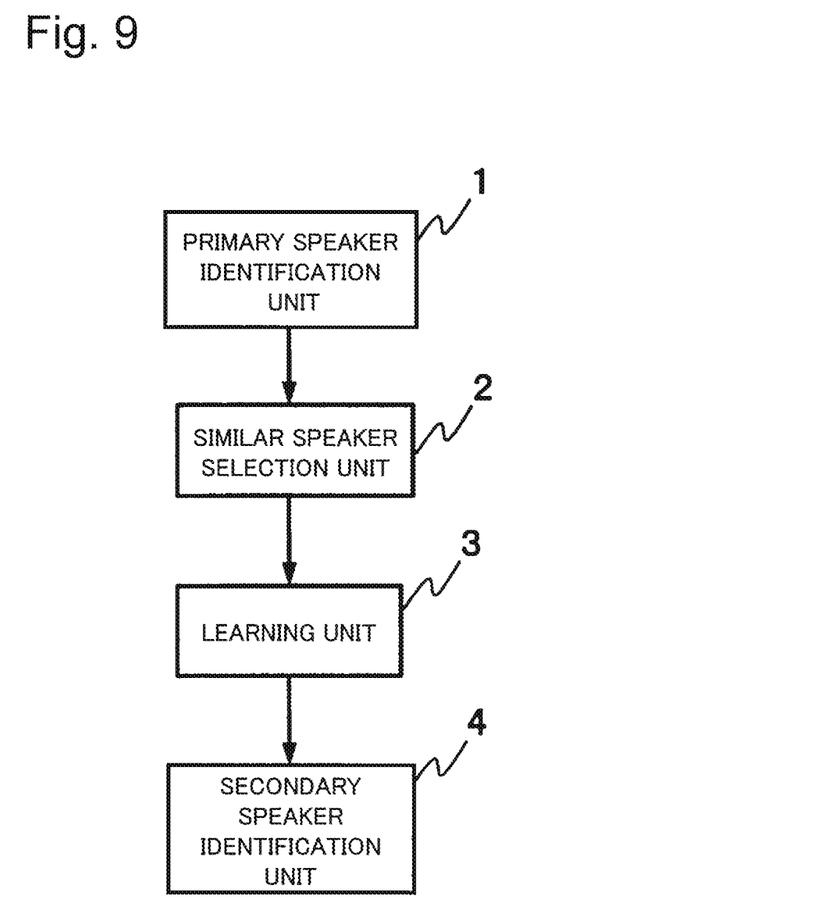
FIG. 9 is a block diagram illustrating a configuration of main components of a speaker identification device according to the present invention.

FIG. 9 is a block diagram illustrating a configuration of main components of the speaker identification device according to the present invention. As illustrated in FIG. 9, the speaker identification device according to the present invention includes, as main components, a primary speaker identification unit 1 that computes, for each pre-stored registered speaker, a score that indicates the similarity between input speech and speech of the registered speakers, a similar speaker selection unit 2 that selects a plurality of the registered speakers as similar speakers according to the height of the scores, a learning unit 3 that creates a classifier for each similar speaker by sorting speech of a certain similar speaker among the similar speakers as a positive instance and speech of the other similar speakers as negative instances, and a secondary speaker identification unit 4 that computes for each classifier a score of the classifier with respect to the input speech and outputs an identification result.

Further, the exemplary embodiments described above also disclose the speaker identification device described in the following (1) to (4).

(1) A speaker identification device in which a learning unit (for example, the learning unit 3) stores in advance pairs of similar speakers selected by a similar speaker selection unit (for example, the similar speaker selection unit 2) in the past and classifiers created by the learning unit in the past as history, and creates a classifier only when there is a difference between the similar speakers in the history and the similar speakers selected by the similar speaker selection unit. According to such a speaker identification device, learning processing can be accelerated (skipped) by creating a classifier only when there is a difference from the history.

(2) The speaker identification device may be configured so that the similar speaker selection unit selects a preset number of similar speakers.

(3) The speaker identification device may be configured so that the similar speaker selection unit selects similar speakers by a preset threshold of scores as a criterion. This makes it possible to suppress deterioration of identification precision due to lack of learning data in the later stage (the secondary speaker identification unit 4) and accelerate the learning processing.

(4) The speaker identification device may be configured so that the classifier is an SVM and the score of the classifier is a distance from the feature point of the input speech to the classification plane.

This application claims priority based on Japanese Patent Application No. 2013-006350 filed on Jan. 17, 2013, the disclosure of which is incorporated herein in its entirety.

The invention of the present application has been described so far with reference to the above-described embodiments, which is not limited to the embodiment. A variety of modifications that will be understood by those skilled in the art can be made to the configuration and details of the invention of the present application within the scope thereof.

INDUSTRIAL APPLICABILITY

The present invention is applicable to a use for, such as a speaker identification device that specifies a person from input speech and a program for implementing the speaker identification device by a computer. Further, the present invention is applicable to a use for, such as a person search device that specifies a person in the same way as personal authentication using finger prints, faces, handwriting, irises, or in combination thereof. Furthermore, the present invention is applicable to a use for a device that automatically assigns a speaker index to a video content that incorporates speech, a content search device that search a content, and the like.

REFERENCE SIGNS LIST

1 Primary speaker identification unit
2 Similar speaker selection unit
3 Learning unit
4 Secondary speaker identification unit
5 Registered speaker DB

What is claimed is:

1. A speaker identification device comprising:
a primary speaker identification unit which computes, for each registered speaker stored in advance, a score that indicates similarity between input speech and speech of the registered speakers;
a similar speaker selection unit which selects a plurality of the registered speakers as similar speakers according to height of the scores;
a learning unit which creates a plurality of classifiers, each classifier corresponding to a different speaker of similar speakers,
wherein for each classifier, the classifier corresponds speech of the different speaker to which the classifier corresponds as a positive instance and speech of other speakers of the similar speakers as negative instances; and
a secondary speaker identification unit which computes, for each classifier, a score of the classifier with respect to the input speech and outputs an identification result.

2. The speaker identification device according to claim 1, wherein
the learning unit stores in advance pairs of the similar speakers selected by the similar speaker selection unit in the past and classifiers created by the learning unit in the past as history, and creates a classifier only when there is a difference between the similar speakers in the history and the similar speakers selected by the similar speaker selection unit.

3. The speaker identification device according to claim 1, wherein the similar speaker selection unit selects a preset number of the similar speakers.

4. The speaker identification device according to claim 1, wherein the similar speaker selection unit selects the similar speakers based on a preset score threshold.

5. The speaker identification device according to claim 1, wherein the classifier is a Support Vector Machine (SVM), and the score of the classifier is a distance from a feature point of the input speech to a classification plane.

6. A speaker identification method comprising:
computing, for each registered speaker stored in advance, a score that indicates similarity between input speech and speech of the registered speakers;
selecting a plurality of the registered speakers as similar speakers according to height of the scores;
creating a plurality of classifiers, each classifier corresponding to a different speaker of similar speakers;
for each classifier, corresponding, by the classifier, speech of the different speaker to which the classifier corresponds as a positive instance and speech of other speakers of the similar speakers as negative instances; and
computing, for each classifier, a score of the classifier with respect to the input speech and outputting an identification result.

7. A non-transitory computer readable medium that stores therein a speaker identification program that causes a computer to execute:
primary speaker identification processing of computing, for each registered speaker stored in advance, a score that indicates similarity between input speech and speech of the registered speakers;
similar speaker selection processing of selecting a plurality of the registered speakers as similar speakers according to height of the scores;

learning processing of creating a plurality of classifiers, each classifier corresponding to a different speaker of similar speakers;

for each classifier, corresponding, by the classifier, speech of the different speaker to which the classifier corresponds as a positive instance and speech of other speakers of the similar speakers as negative instances; and secondary speaker identification processing of computing, for each classifier, a score of the classifier with respect to the input speech and outputs an identification result.

* * * * *